United States Patent
Rodriguez et al.

(10) Patent No.: US 8,259,222 B2
(45) Date of Patent: Sep. 4, 2012

(54) PORTABLE MULTI POSITION MAGNIFIER CAMERA

(75) Inventors: Carlos M. Rodriguez, Palm Harbor, FL (US); Patrick Murphy, Riverview, FL (US); Waldemar Tunkis, Palm Harbor, FL (US); Brad Davis, Largo, FL (US); Todd Conard, Ruskin, FL (US); Lee Hamilton, Tampa, FL (US); Michael Goldenberg, Melbourne Beach, FL (US); Jeffrey McDaniel, Largo, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 566 days.

(21) Appl. No.: 12/235,182

(22) Filed: Sep. 22, 2008

(65) Prior Publication Data

US 2010/0026854 A1    Feb. 4, 2010

Related U.S. Application Data

(60) Provisional application No. 61/085,966, filed on Aug. 4, 2008.

(51) Int. Cl.
*H04N 5/225* (2006.01)
(52) U.S. Cl. .................. 348/373; 348/63; 348/240.99
(58) Field of Classification Search .............. 348/63, 348/240.99, 240.1–240.3, 373
See application file for complete search history.

(56) References Cited

U.S. PATENT DOCUMENTS

| | | | |
|---|---|---|---|
| 3,252,067 A | 5/1966 | Derenbecher, Jr. | |
| 3,253,529 A | 5/1966 | Fahlenberg | |
| 3,850,523 A | 11/1974 | Skavnak | |
| 4,362,806 A | 12/1982 | Whitmore | |
| 4,456,931 A | 6/1984 | Toyoda et al. | |
| 4,799,049 A | 1/1989 | Avila | |
| 5,335,192 A | 8/1994 | Oshiba | |
| 5,633,674 A | 5/1997 | Trulaske et al. | |
| 5,703,661 A | 12/1997 | Wu | |
| 5,717,964 A | 2/1998 | Dowe | |
| 5,739,859 A | 4/1998 | Hattori et al. | |
| 5,748,228 A | 5/1998 | Kobayashi et al. | |
| 5,815,735 A | 9/1998 | Baker | |
| 5,893,651 A * | 4/1999 | Sakamoto | 348/240.3 |
| D454,146 S | 3/2002 | Mori | |
| 6,636,359 B2 | 10/2003 | Travers et al. | |
| 6,642,505 B1 | 11/2003 | Nakano et al. | |
| D488,440 S | 4/2004 | Senda | |
| 6,767,107 B1 | 7/2004 | Leifer et al. | |
| 6,809,741 B1 | 10/2004 | Bates et al. | |
| D503,944 S | 4/2005 | Adachi et al. | |
| 6,956,616 B2 | 10/2005 | Jung et al. | |

(Continued)

FOREIGN PATENT DOCUMENTS

EP    1921838 A2    5/2008
(Continued)

*Primary Examiner* — Gevell Selby
(74) *Attorney, Agent, or Firm* — GrayRobinson, P.A.; Michael J. Colitz, III

(57) ABSTRACT

Disclosed is a portable magnifier camera that can be selectively positioned into a variety of configurations. At least four distinct viewing configurations are provided: a reading mode wherein the camera rests flatly upon the viewed object; a writing mode wherein the camera rests at an angle upon the viewed object; a hand-held mode wherein the user holds the camera relative to a distant object; and an inspection mode wherein the user holds the viewed object relative to the camera. These configurations enable a user to effectively view objects of differing size and at varying distances.

12 Claims, 7 Drawing Sheets

U.S. PATENT DOCUMENTS

| | | | |
|---|---|---|---|
| 6,971,600 B2 * | 12/2005 | Cheung | 242/242 |
| 6,977,676 B1 | 12/2005 | Sato et al. | |
| 7,106,357 B2 | 9/2006 | Fukuda et al. | |
| 7,119,319 B2 | 10/2006 | Noto et al. | |
| 7,170,557 B2 | 1/2007 | Manico et al. | |
| 7,172,304 B2 | 2/2007 | Rodriguez et al. | |
| 7,172,305 B2 | 2/2007 | Rodriguez et al. | |
| 7,295,244 B2 | 11/2007 | Manico et al. | |
| 7,336,295 B2 | 2/2008 | Sukenari et al. | |
| D614,220 S | 4/2010 | Goldenberg | |
| 8,115,831 B2 | 2/2012 | Rodriguez et al. | |
| 2001/0002850 A1 | 6/2001 | Slatter | |
| 2002/0063791 A1 | 5/2002 | Waterman et al. | |
| 2002/0071047 A1 | 6/2002 | Strong et al. | |
| 2003/0063214 A1 | 4/2003 | Van Hees | |
| 2003/0210340 A1 | 11/2003 | Romanowich | |
| 2004/0246340 A1 | 12/2004 | Sukenari et al. | |
| 2005/0141099 A1 | 6/2005 | Bang et al. | |
| 2005/0162512 A1 | 7/2005 | Seakins | |
| 2006/0018508 A1 | 1/2006 | Monk et al. | |
| 2006/0034601 A1 | 2/2006 | Andersson et al. | |
| 2006/0158427 A1 * | 7/2006 | Goldenberg et al. | 345/156 |
| 2006/0268569 A1 | 11/2006 | Rodriguez et al. | |
| 2007/0018919 A1 | 1/2007 | Zavracky et al. | |
| 2007/0040907 A1 | 2/2007 | Kern et al. | |
| 2007/0223906 A1 | 9/2007 | Hanney et al. | |
| 2007/0263014 A1 | 11/2007 | Ketola et al. | |
| 2007/0273708 A1 | 11/2007 | Andreasson et al. | |
| 2007/0296845 A1 * | 12/2007 | Watanabe et al. | 348/333.12 |
| 2008/0165141 A1 | 7/2008 | Christie | |
| 2009/0059038 A1 * | 3/2009 | Seakins et al. | 348/240.99 |
| 2009/0160996 A1 | 6/2009 | Yamaoka et al. | |
| 2010/0026855 A1 | 2/2010 | Conard et al. | |
| 2010/0073545 A1 | 3/2010 | Rodriguez et al. | |

FOREIGN PATENT DOCUMENTS

| | | |
|---|---|---|
| GB | 2403370 A | 12/2004 |

* cited by examiner

PORTABLE MULTI POSITION MAGNIFIER CAMERA

CROSS REFERENCES TO RELATED APPLICATIONS

This application claims benefit of application Ser. No. 61/085,966 filed on Aug. 4, 2008 and entitled "Portable Multi Position Magnifier Camera." The contents of this application are incorporated herein by reference.

FIELD OF THE INVENTION

This invention relates to a magnification device for individuals with low vision. More particularly, the present invention relates to a portable magnification device that has a variety of discrete configurations.

DESCRIPTION OF THE BACKGROUND ART

The use of portable magnifiers for low vision users is known in the art. To date, however, these magnifiers have been heavy, bulky, and cumbersome to use. Additionally, many of these magnifiers have only one mode of operation, a mode that requires the user to hold the device at a fixed distance above the object being viewed.

Additionally, many magnifiers that are designed to be placed upon the object to be viewed typically leave little or no room over top of the object. This prohibits the user from interacting with the object being viewed. For instance, if the object is a document, a user cannot write upon the document while it is being magnified.

What is needed, then, is a magnifier with multiple configurations and modes of operation, whereby a user can use the magnifier by either holding the device over the object or by placing the device upon the object. There is an additional need for a magnifier that allows users to interact with the object while it is being magnified. There is also a need in the art for a portable magnifier that has a compact closed orientation that protects the magnifier when it is not in use. The portable multi position magnifier camera of the present invention is directed at fulfilling these needs.

SUMMARY OF THE INVENTION

It is therefore one of the objectives of this invention to allow a user to configure a magnifier camera into one of a variety of viewing modes so as to optimize the viewing of different sized objects at differing distances.

It is another objective of this invention to provide a magnifier camera that can either be held over an object to be viewed or positioned upon the object to be viewed.

It is a further object of this invention to provide a magnifier camera that can be positioned upon an object to be viewed, while at the same time providing a clearance space to permit the user to interact with the object.

It is yet another objective of this invention to provide a magnifier camera that has a closed orientation that is compact and readily transportable and which protects the components of the camera.

Another object of this invention is to provide a rheostat-type controller for increasing functionality and ease of use.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to portable magnifier camera that can be selectively positioned into a variety of configurations. At least four distinct viewing configurations are provided: a reading mode wherein the camera rests flatly upon the viewed object; a writing mode wherein the camera rests at an angle upon the viewed object; a hand-held mode wherein the user holds the camera relative to a distant object; and an inspection mode wherein the user holds the viewed object in close proximity to the camera. These configurations enable a user to effectively view objects of differing size and at varying distances.

Figure 1:
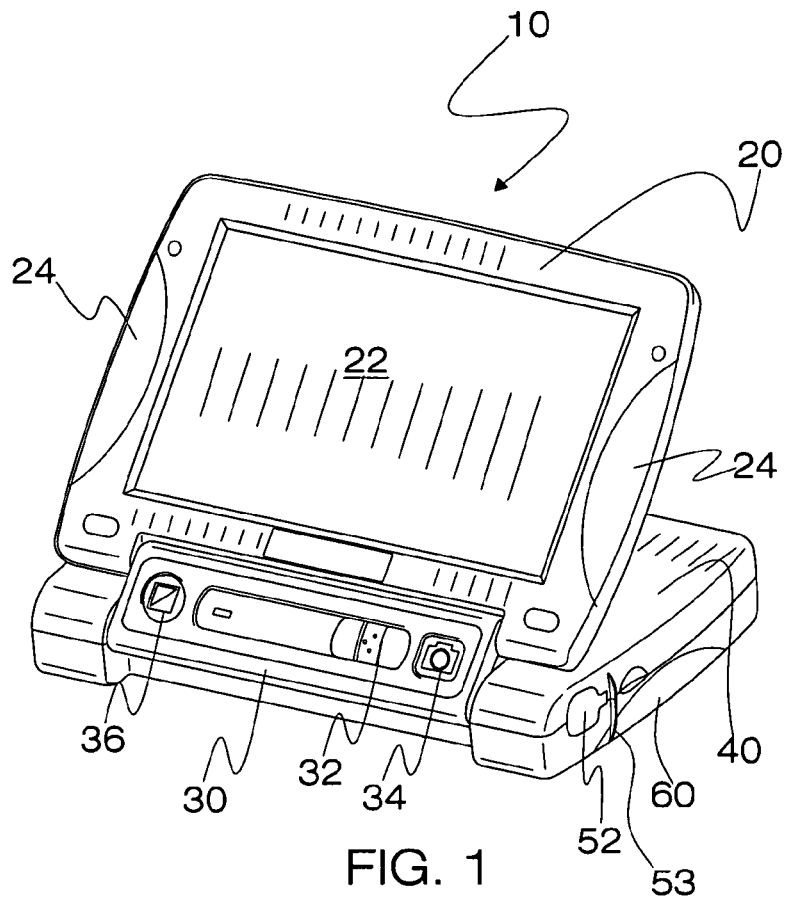
FIG. 1 is a perspective view of the magnifier camera of the present invention in a reading mode whereby the magnifier is placed upon an object to be viewed.

The camera 10 of the present invention is depicted in FIG. 1. The camera 10 includes four housing components that are pivotally interconnected in a manner that provides for multiple discrete configurations. These housing components include a cover 20, a control panel 30, a camera housing 40, and a base 60. These components are preferably constructed from a lightweight impact resistant plastic. An acrylonitrile butadiene styrene (ABS) plastic, or the equivalent, is preferred.

Cover 20 includes an LCD screen 22 that is positioned within its interior face. The inner surface also includes opposing indentations 24 that permit screen 22 to be easily gripped and manipulated by the user. The exterior face of cover 20 serves to protect the various components of camera 10 when it is in a closed configuration (note FIG. 2c). Screen 22 is preferably a full color video graphics array (VGA) display. The input to the LCD screen 22 comes from a field programmable gate array (FPGA) that resides within camera housing 40. In the preferred embodiment, low-voltage differential signaling (LVDS) is employed in interconnecting FPGA to LCD screen 22. This renders a purely digital output on screen 22 and also permits camera 10 to be used in conjunction with an external monitor (not shown).

Cover 20 is pivotally interconnected to a control panel 30. Control panel 30 includes a centrally located slider 32 as well as adjacent touch sensitive controls 34 and 36. Slider 32 provides for the variable control of one or more camera functions. The variable control can be accomplished via a variable resistor, such as a rheostat, potentiometer, or like equivalents. Control 34 can be used to take "snap shots" of the object being viewed. These static images can be stored in a memory for later viewing. Control 36 can be used to cycle through the modes controlled by slider 32.

In one mode, slider 32 is used to vary the camera magnification. For instance, by moving slider to the right (as noted in FIG. 1) a user can change the magnification continuously from 3.5× to 14×. In another mode, slider 32 is used to change the color combinations of screen 22. Namely, in order to enhance viewing for low vision users, LCD screen 22 can display the object being viewed in various color combinations, such as blue/green, red/yellow or black/white. Thus, slider 32 can be used to cycle through the various color combinations to find the most effective output for the user. This feature can be used in conjunction with both live camera views as well as static images that have been stored within the camera's memory. In either case, slider 32 has the advantage of permitting the user to easily cycle through a variety of color options.

Slider 32 can also be used to navigate through a static or live camera image. For instance, in one mode, movement of the slider shifts the image from right to left. In another mode, movement of the slider shifts the image up and down. Both the vertical and horizontal navigation modes can be used in conjunction with the magnification mode to allow the user to zoom into any portion of the image.

Figure 2A:
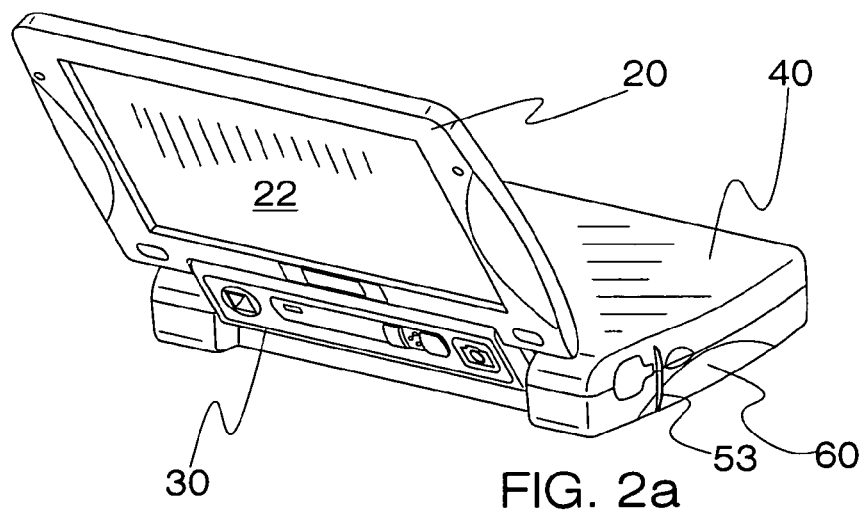
FIG. 2a is a perspective view of the magnifier camera being reconfigured from a reading mode to a closed configuration.
Figure 2B:
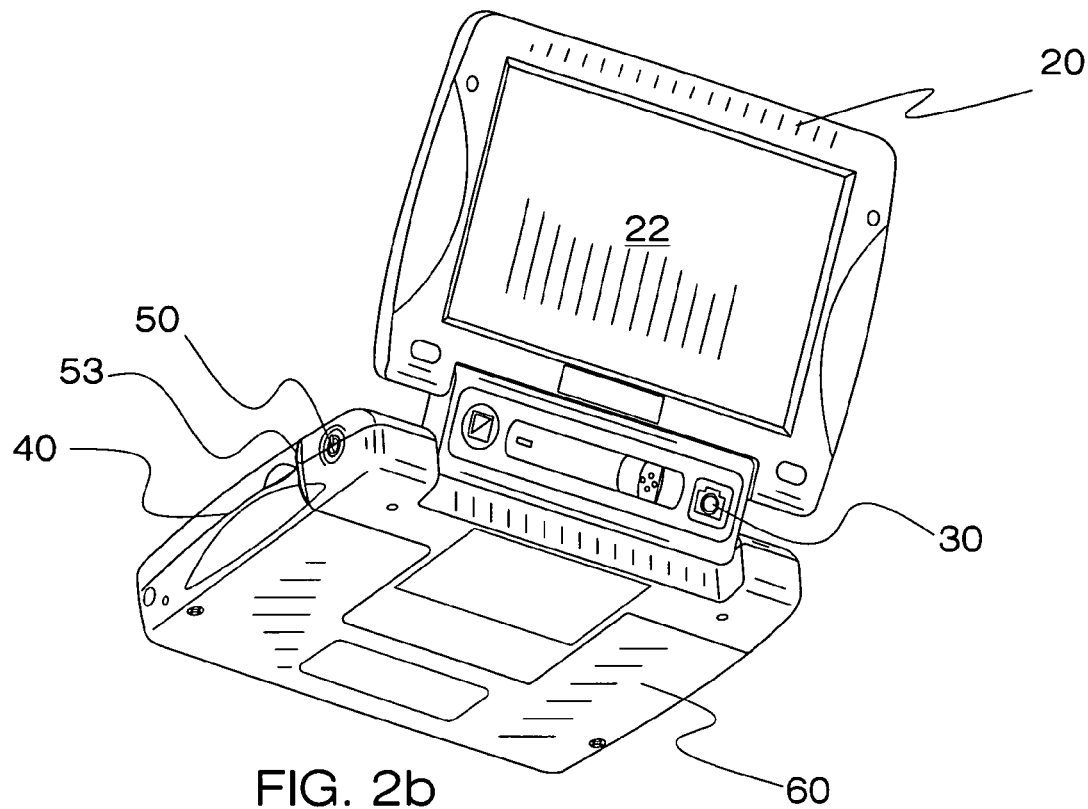
FIG. 2b is an additional perspective view of the magnifier camera being reconfigured from a reading mode to a closed configuration.
Figure 2C:
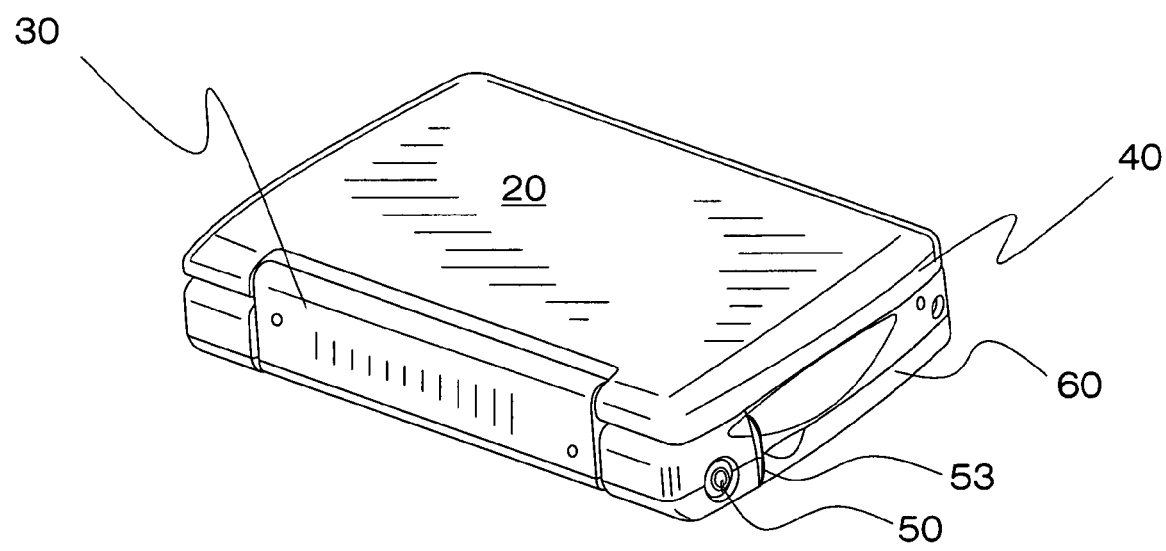
FIG. 2c is a perspective view of the magnifier camera in the closed configuration.
Figure 3:
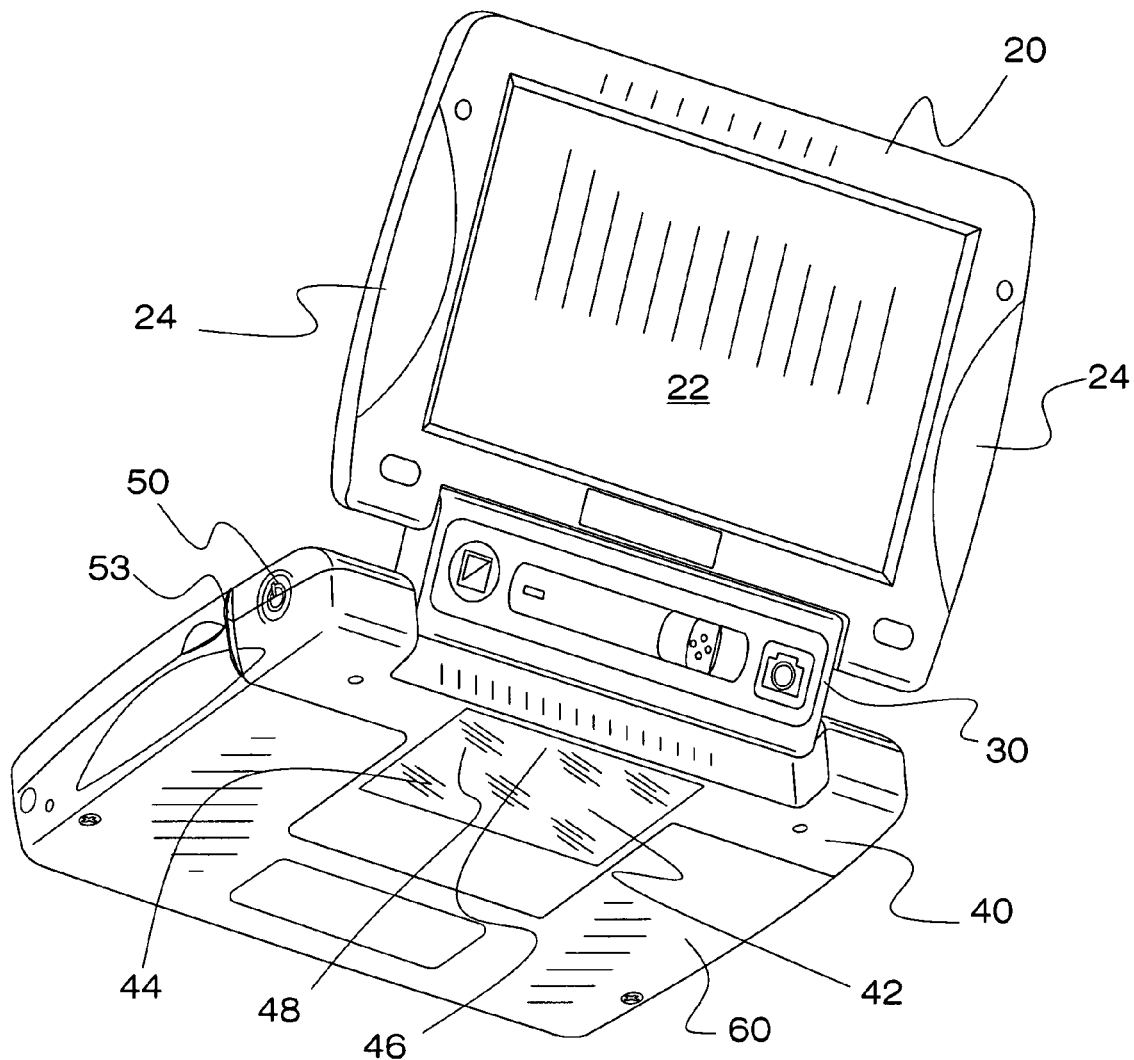
FIG. 3 is a detailed view of the underside of the magnifier camera showing the camera and associated mirror.

As noted in FIGS. 2a-2c, camera housing 40 is pivotally connected to control panel 30. Thus, in effect, control panel 30 serves as a hinge between cover 20 and housing 40. With reference to FIG. 1, it will be noted that housing 40 includes an output 52 for coupling camera 10 to an external monitor or television. A power button 50 is also included on the opposite side of housing 40 (note FIG. 3). The device can further be configured to power itself off when in the closed configuration (FIG. 2c).

Figure 4:
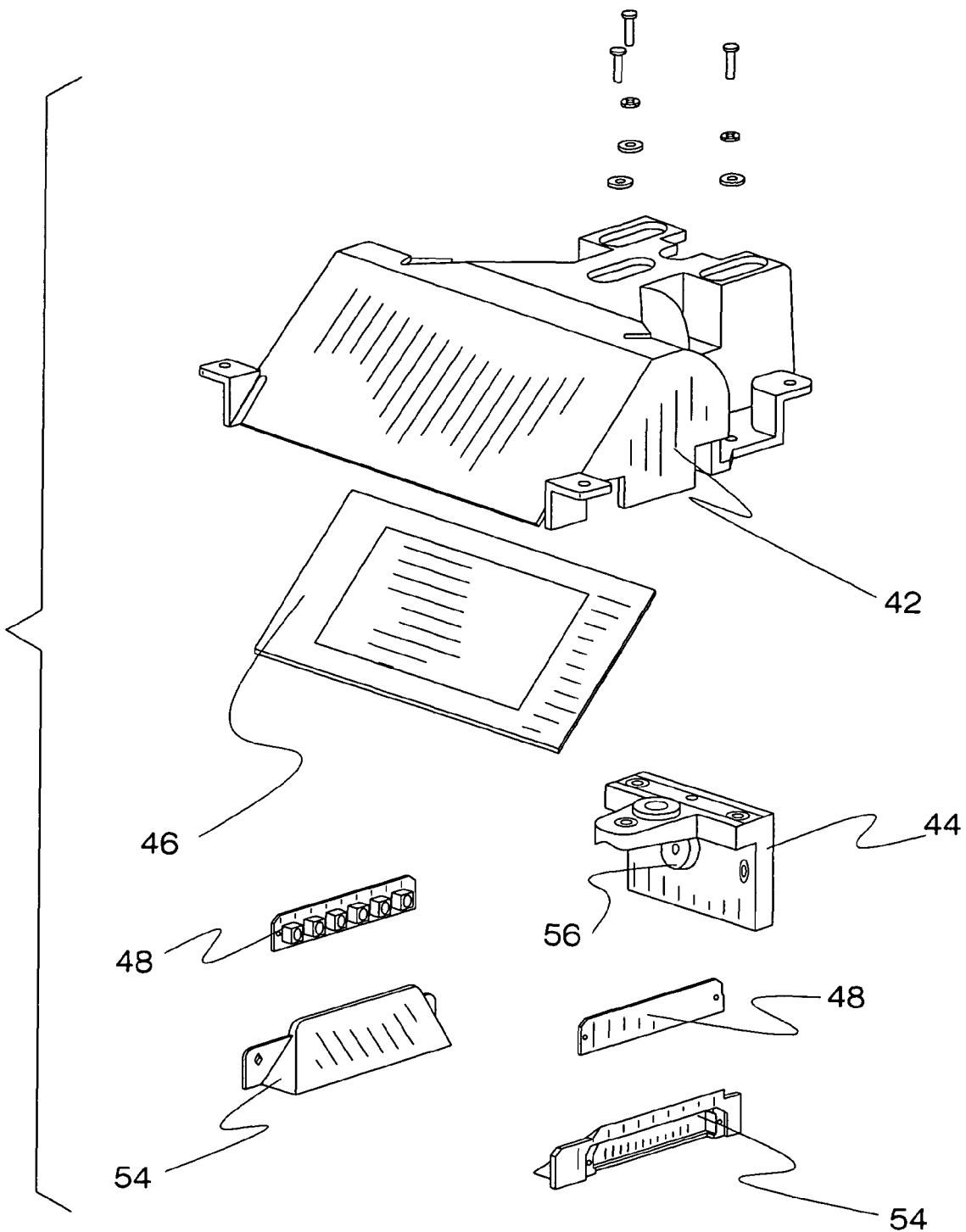
FIG. 4 is an exploded view of the lighting chamber of the present invention.

The optical components associated with camera 10 are stored within a chamber 42 positioned within camera housing 40. As noted in FIGS. 3 and 4, these optical components include a sensor 44, a mirror 46 (which is positioned on an angled surface within the chamber), a light source 48, light guides 54, and an optical lens 56. Chamber 42 preferably includes a rounded or curved interior surface that is lightly colored so as to promote reflection. Light source 48 is preferably two rows of light emitting diodes (LEDs) that are mounted to vertical surfaces within the chamber 42. Other light sources, such as cold cathode fluorescent lamps (CCFL), can be used in conjunction with the invention. Still yet other light sources will be readily identified by those skilled in the art. Light guides are used in directing the light from the LEDs both towards the viewed object and to the interior of chamber 42. A suitable light guide is described in commonly owned U.S. Pat. No. 7,172,304 to Rodriguez et al., the contents of which are fully incorporated herein. Sensor 44 is preferably a 3 megapixel CMOS image sensor. Such sensors are commercially available and those of ordinary skill in the art will appreciate suitable equivalents thereto. The output of the image sensor is provided to the FPGA and to an image buffer.

In use, chamber 42 is either placed over an image plane or otherwise pointed towards the object to be viewed. The image of the viewed object is then picked up by mirror 46. Sensor 44 and lens 56 are positioned within chamber 42 so as to record the image reflected by mirror 46. However, the use of other configurations is within the scope of the present invention. Alignment guides 53 are included on the sides of the housing to assist blind or low vision users in properly orienting the chamber 42 relative to the object to be viewed.

Figure 5:
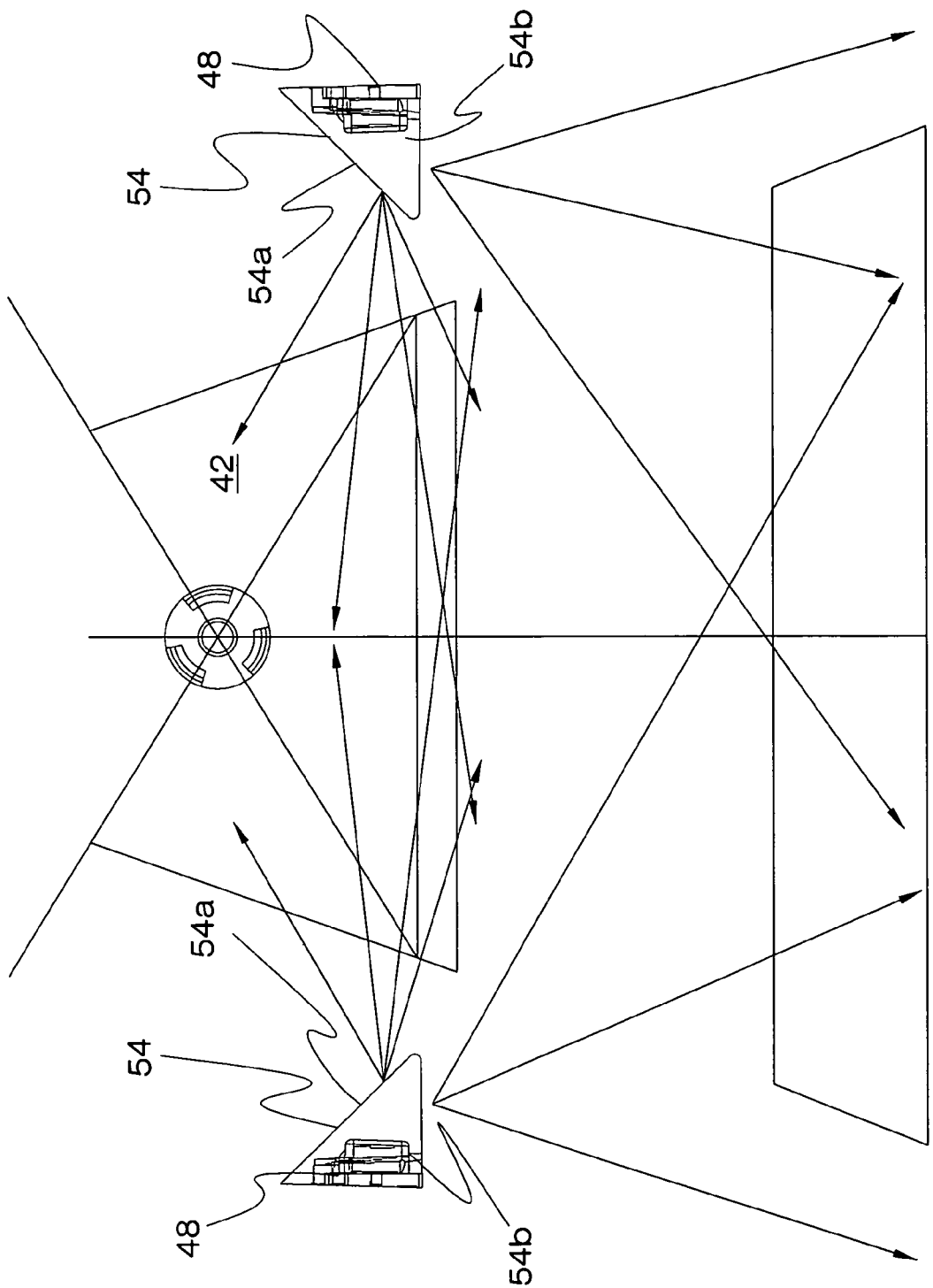
FIG. 5 is a diagram showing how lighting is distributed within the lighting chamber of the present invention.

The light provided to light guides is also adjustable to permit the selective control of direct and indirect light provided to the object being viewed. Namely, for near objects, such as those viewed in the reading mode, the light from guides 54 is directed into the interior of chamber 42, thereby increasing the amount of indirect lighting used. This is accomplished by directing more light through the upper surfaces 54a of light guides 54. The resulting indirect lighting is preferred for closely positioned objects. By contrast, in the writing and handheld modes, the light will be primarily directed through the lower surface 54b of light guides 54. As noted in FIG. 5, lower surfaces 54b are generally parallel to the image plane while upper surfaces 54a are angled with respect to the image plane. This results in distant objects being illuminated with more direct lighting, which is preferred in such situations.

The various configurations of camera 10 are described next. These configurations are achieved by pivotally interconnecting housing 40 to both control panel 30 and to base 60. More specifically, the forward end of housing 40 is connected to control panel 30 while the rearward end is connected to base 60. However, in the preferred embodiment, the connection between base 60 and housing 40 permits only a limited degree of angular adjustment. Base 60 is preferably formed from two opposing feet 60a and 60b (note FIG. 6). A clearance space 62 is provided between feet 60a and 60b so as to permit an unobstructed view of objects by camera 44. Additional clearance space can be created by pivoting housing 40 relative to base 60 as noted more fully hereinafter. A power supply (not shown) is preferably stored within one or both feet 60a and 60b. The power supply can be, for example, a re-chargeable lithium ion battery.

Reading Mode

The reading mode is depicted in FIG. 1. In this mode, base 60 rests upon the object being viewed. Both cover 20 and control panel 30 can be angled for optimal viewing by the user. This is the preferred mode for viewing flat objects, such as a page of text, where there is no need for the user to interact with the viewed object. Light guides 54 can be adjusted while in the reading mode to provide more indirect light. Indirect lighting is preferred in the reading mode due to sensor 44 being closer to the viewed object.

Writing Mode

Figure 6:
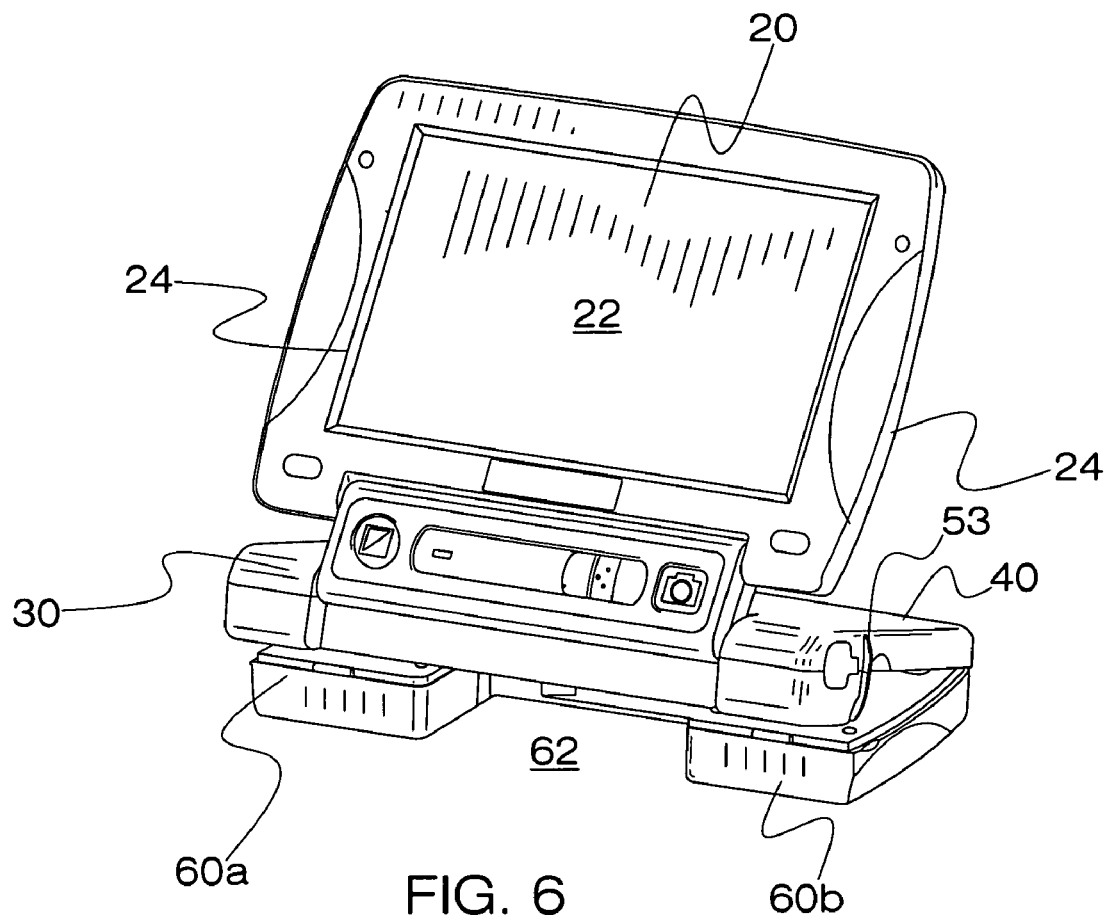
FIG. 6 is a perspective view of the magnifier camera in the writing stand mode.

In the event the user needs to interact with the viewed object, the writing mode is preferred. The writing mode is illustrated in FIG. 6. In this mode, base 60 again rests upon the object being viewed. However, unlike the reading mode, housing 40 is pivoted slightly with respect to base 60. In the preferred embodiment, this angle is no more than 45 degrees. By pivoting housing 40 upwardly, a space 62 is created. Space 62 allows a user to, for instance, write upon the object being viewed. This mode can be used, for example, if the user wishes to sign a document or fill out a check. The light guides 54 can be adjusted while in the writing mode to provide more direct light. Direct lighting is preferred in the writing mode due to sensor 44 being further away from the viewed object.

Hand-Held Mode

Figure 7:
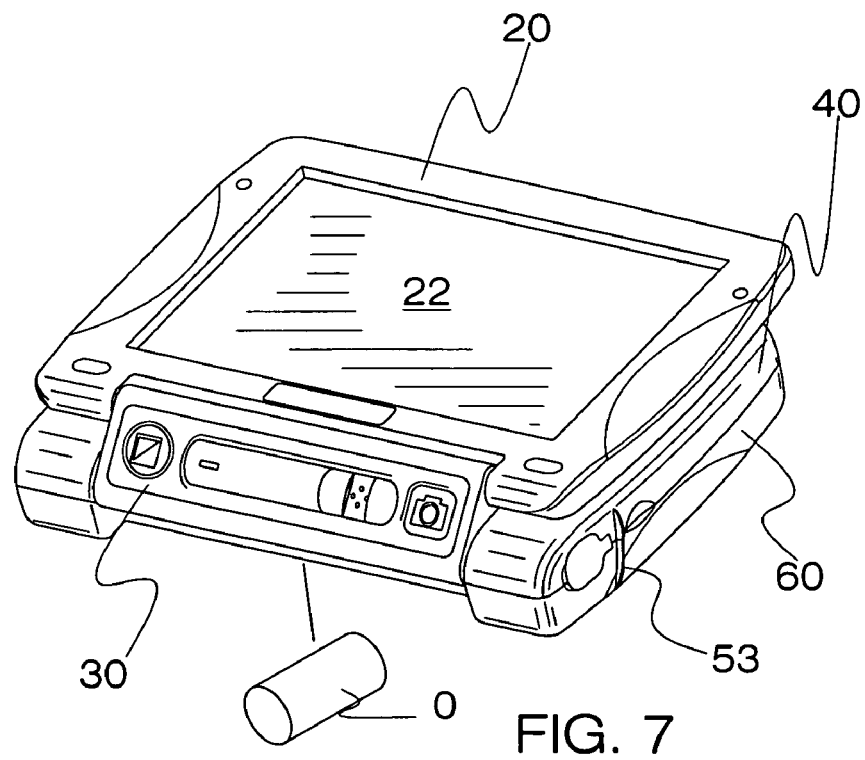
FIG. 7 is a perspective view of the magnifier camera in the handheld mode.

The hand-held mode is depicted in FIG. 7. Here, cover 20 is pivoted such that its exterior surface contacts base 40. Additionally, instead of base 60 resting upon the object to be viewed, feet 60a and 60b of base are grasped by the user. The permits camera 10 to be picked up and pointed at distant objects. During this viewing, control 34 can be used to take static images of the object "O" being viewed.

Inspection Mode

Figure 8:
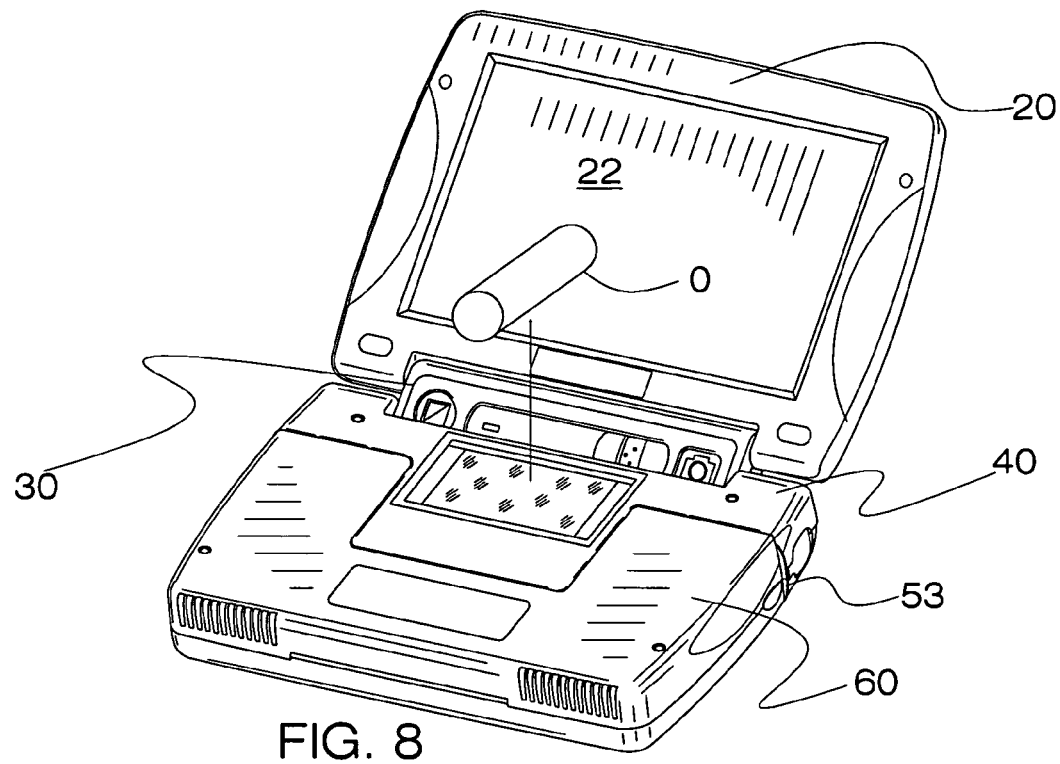
FIG. 8 is a perspective view of the magnifier camera in the inspection mode of operation.
Figure 9:
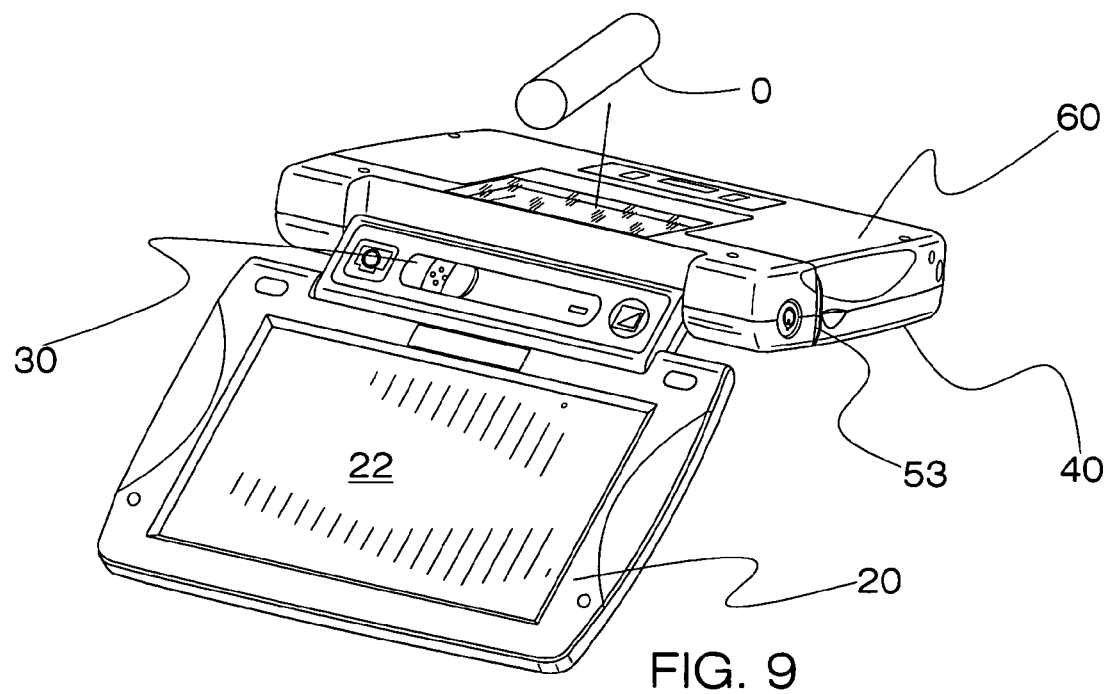
FIG. 9 is a perspective view of the magnifier camera in the inspection mode of operation.

Finally, the inspection mode of camera 10 is illustrated in FIGS. 8 and 9. In this mode, base 60 is pivoted so that the chamber 42 is pointing towards the user. The allows the user to hold objects "O" in front of the camera for inspection. As noted by FIGS. 8 and 9, LCD screen 22 can be positioned in differing orientations while in the inspection mode.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A multi position portable camera for magnifying an object, the camera comprising:
   a cover having exterior and interior surfaces and a liquid crystal display (LCD) positioned within the interior surface;
   a control panel pivotally connected to the cover, the control panel including a sliding control for selectively varying the magnification of the camera;
   a camera housing having forward and rearward portions, upper and lower surfaces, the forward portion being pivotally connected to the control panel, the camera housing including a chamber formed within its lower surface, the chamber including a partially curved interior, a mirror positioned within the chamber for reflecting the image of the object being magnified, a sensor mounted within the chamber for sensing the image reflected by the mirror, the output of the sensor being viewable on the LCD with the magnification being selected via the sliding control, a light source and an associated light guide being positioned within the chamber, the light guide selectively controlling the amount of light received by the object;
   a base being pivotally connected to the rearward portion of the camera housing, the base including two feet with a clearance space formed therebetween, wherein the base can be pivoted relative to the camera housing as to orient the object within the clearance space and beneath the chamber.

2. A magnifier camera comprising:
   a cover including a display screen, the cover having opened and closed orientations;
   a hinge pivotally connected to the cover;
   a housing pivotally connected to the hinge, whereby the hinge permits the display screen to be oriented relative to the housing to accommodate the user;
   a sensor assembly positioned within the housing and adapted to take images of objects positioned beneath the housing, wherein the images are thereafter displayed on the display screen;
   a base pivotally connected to the housing, wherein a user can selectively pivot the base to thereby properly orient the object relative to the sensor assembly
   a control panel for controlling one or more functions of the magnifier camera, the control panel being positioned upon the hinge and being accessible when the cover is in the opened orientation.

3. The magnifier camera as described in claim 2 wherein the base includes two feet that are separated by a clearance space and wherein the object is adapted to be positioned within the clearance space.

4. The magnifier camera as described in claim 2 wherein the sensor assembly includes at least one light source and an associated light guide and wherein the light guide controls the amount of light directed to the object.

5. The magnifier camera as described in claim 2 wherein the sensor assembly includes a mirror and wherein the sensor reads the image reflected from the mirror.

6. The magnifier camera as described in claim 2 wherein the sensor is positioned within a chamber that is designed to reflect light so as to illuminate the object with indirect lighting.

7. The camera as described in claim 2 wherein the hinge includes a sliding control for selectively cycling through various color combinations displayed by the display.

8. A camera device for blind or low vision users, the camera device comprising:
   a camera housing and an interconnected writing stand;
   a display screen interconnected to the camera housing for viewing images taken by the camera device;
   the camera device having a first orientation wherein the writing stand is at an angle relative to the camera housing and a second orientation wherein the writing stand and the camera housing are co-planar;
   wherein the camera housing is pivotally interconnected to the display screen by way of a control panel.

9. The camera device as described in claim 8 wherein the writing stand houses a power supply.

10. A camera device for blind or low vision users, the camera device comprising:
   a camera housing and an interconnected writing stand;
   a display screen interconnected to the camera housing for viewing images taken by the camera device;
   the camera device having a first orientation wherein the writing stand is at an angle relative to the camera housing and a second orientation wherein the writing stand and the camera housing are co-planar;
   wherein alignment guides are formed within the camera housing and writing stand.

11. The camera device as described in claim 10 wherein the display screen can be pivoted to be in facing relation with the camera housing.

12. The camera device as described in claim 8 wherein the camera device is a magnifier camera and wherein a rheostat type control is included on the control panel.

* * * * *

UNITED STATES PATENT AND TRADEMARK OFFICE
CERTIFICATE OF CORRECTION

| | | |
|---|---|---|
| PATENT NO. | : 8,259,222 B2 | Page 1 of 1 |
| APPLICATION NO. | : 12/235182 | |
| DATED | : September 4, 2012 | |
| INVENTOR(S) | : Carlos M. Rodriguez et al. | |

It is certified that error appears in the above-identified patent and that said Letters Patent is hereby corrected as shown below:

In the Specification:

Col. 3, line 4, the term "face of cover 20" should be "face of cover 22".

Col. 6, line 11, the term "sensor assembly" should be "sensor assembly;".

Signed and Sealed this
First Day of October, 2013

Teresa Stanek Rea
*Deputy Director of the United States Patent and Trademark Office*